Sept. 5, 1933.    C. R. BROWNELL    1,925,172
HIGH SPEED TWISTING MACHINE
Filed May 24, 1930    2 Sheets-Sheet 1

Inventor
Carl R. Brownell
By Orben W. Kennedy
Attorney

Sept. 5, 1933.         C. R. BROWNELL         1,925,172
HIGH SPEED TWISTING MACHINE
Filed May 24, 1930         2 Sheets-Sheet 2

Inventor
Carl R. Brownell
By Owen W. Kennedy
Attorney

Patented Sept. 5, 1933

1,925,172

UNITED STATES PATENT OFFICE 1,925,172

HIGH SPEED TWISTING MACHINE

Carl R. Brownell, Worcester, Mass., assignor to G. L. Brownell, Inc., Worcester, Mass., a corporation of Massachusetts Application May 24, 1930. Serial No. 455,240

7 Claims. (Cl. 118—51)

The present invention relates to twisting machines, and the like, wherein filamentary material in twisted form is wound on a spool by a flier rotating at higher speed than the spool. In such machines, as heretofore constructed, it has been customary to support the spools either upon a rotatably driven or "live" spindle, or upon a non-rotatable or "dead" spindle, and with either arrangement provision must be made for dissipating the heat generated by rotation of the spool with respect to the vertically movable spindle rail, as with a live spindle, or between the barrel of the spool and the dead spindle which moves with the rail.

The object of the present invention is to provide an improved construction for twisting machines, and the like, which is characterized by the support of the winding spools on spindles which are dead, in the sense that they are not driven, but which at the same time are freely rotatable with respect to the vertically movable spindle rail. With this construction, friction between the spools and the dead spindles is eliminated, and as will hereinafter appear provision is made for effectively dissipating the heat generated by relative rotation between the spools and the spindle rail. The invention also contemplates an improved driving arrangement and dynamically balanced construction for the flier which winds the twisted material on a spool, whereby the flier may be driven at a speed not heretofore permissible, the non-frictional support of the dead spindle mentioned above also permitting the spool itself to rotate at a speed slightly less than that of the flier, without excessive heating. The above and other advantageous features of the invention will hereinafter more fully appear with reference to the accompanying drawings in which—

Like reference characters refer to like parts in the different figures.

Figure 1:
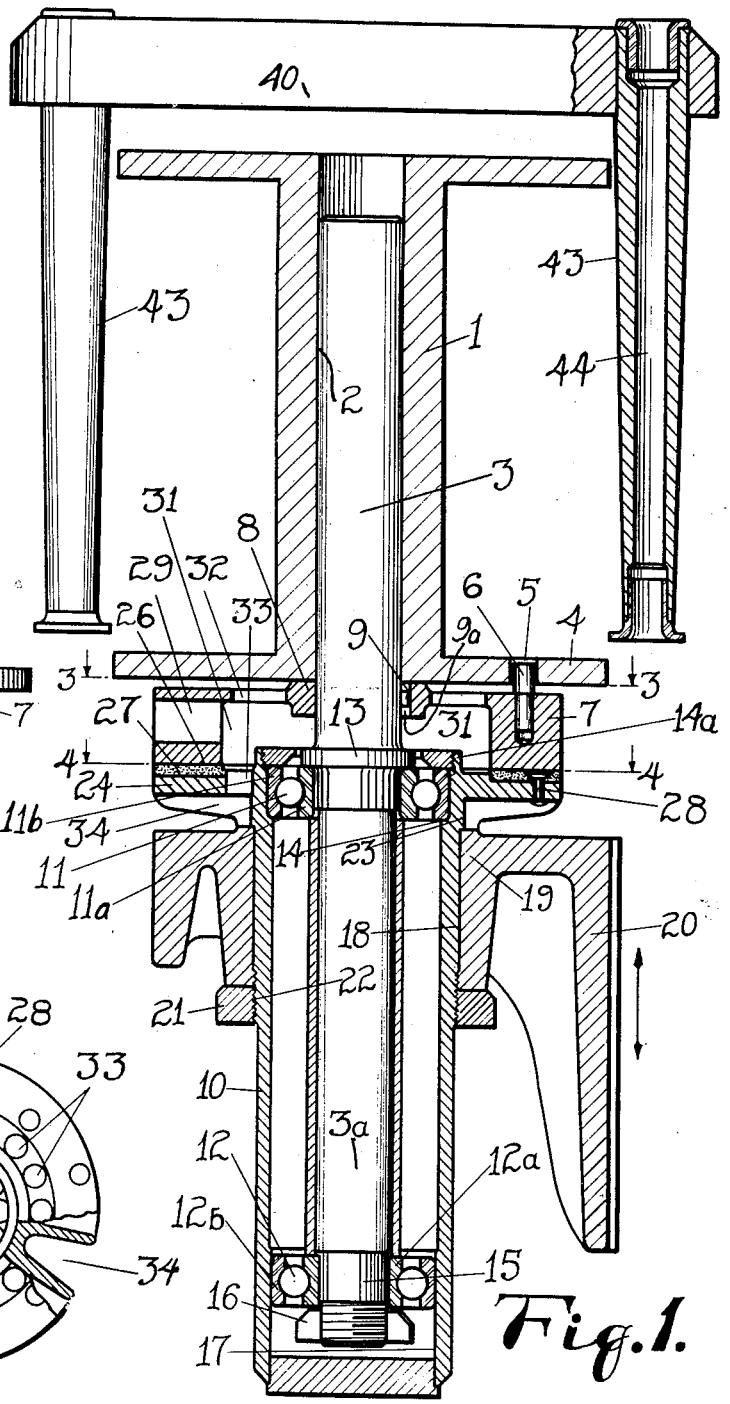
Fig. 1 is a view partially in vertical section and partially in elevation of the spool supporting portion of a machine embodying the invention.

Referring first to Fig. 1, a spool 1 upon which the twisted filamentary material is to be wound provides a central opening 2 in the barrel portion thereof for freely receiving a spindle 3. The lower head 4 of the spool 1 provides diametrically opposed openings 5 for receiving pins 6 projecting upwardly from a circular spool plate 7 providing a central hub portion 8 secured to the spindle 3 by a key 9, slidable in slot 9a.

The lower portion 3a of the spindle 3 is rotatably supported within a stationary sleeve 10 by anti-friction bearings 11 and 12, the inner race 11a of the upper bearing 11 seating against a collar 13 provided between the upper and lower spindle portions 3 and 3a. The outer race 11b of the bearing 11 is received in a seat 14 provided at the top of the bearing sleeve 10, thereby supporting the weight of the spindle assembly. The inner race 12a of the lower bearing 12 is received on a reduced portion 15 at the end of the lower spindle portion 3a and is held thereon by means of a nut 16 threaded on the portion 15. The outer race 12b of the bearing 12 is received snugly within a finished cylindrical surface 17 provided by the inside of sleeve 10, so that the two bearings 11 and 12 support the spindle 3 with its axis vertical. A nut 14a locks bearing 11 in the seat 14.

The spindle bearing sleeve 10 is received within an opening 18 provided in the horizontal portion 19 of a spindle rail 20 that is adapted to have an up and down movement imparted thereto, as indicated by the arrows, in any suitable manner, not shown, since traversing mechanisms for spindle rails are well known in machines of this type. The bearing sleeve 10 is held within the rail opening 18 by means of a nut 21 received on a threaded portion 22 of the sleeve 10, the nut 21 serving to draw a shoulder 23 on the sleeve 10 against the top of the horizontal spindle rail portion 19. With the above described construction, it is obvious that the spindle assembly, including the anti-friction bearings 11 and 12 and sleeve 10 is adapted to move up and down with the spindle rail 20 as a unit, although at the same time the spindle 3 with the spool 1 thereon is adapted for free rotational movement about a vertical axis.

Figure 6:
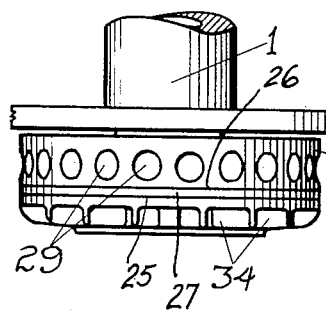
Fig. 6 is a fragmentary view showing a portion of the parts of Fig. 1 in side elevation.

As previously pointed out, one of the objects of the present invention is to provide means for effectively dissipating the heat generated by rotation of the spool 1, and this heat dissipating means contemplates the concentration of the friction resulting from rotation of the spool 1 between the lower face of the spindle plate 7 and a stationary flange 24 provided at the top of the spindle bearing sleeve 10. As best shown in Figs. 1 and 6, the flange 24 provides an annular seat 25 parallel to an annular face 26 formed on the underside of the spool plate 7, and there are interposed between the stationary seat 25 and the rotatable face 26 segments 27 of a ring preferably composed of frictional heat resistant material, such as a composition of asbestos fabric. As shown, the friction segments 27 are secured to the flange 24 by rivets 28 with spaces 27a therebetween, although other means may be utilized for securing the friction ring segments 27 to the flange 24. With the above described construction, it is obvious that the friction segments 27 support the entire weight of the spool plate 7, spool 1 and the material thereon, while the spindle assembly is supported by the bearing 11 with radial thrust of the spindle 3 taken by the lower bearing 12 in maintaining the spindle 3 in vertical alinement.

Figure 3:
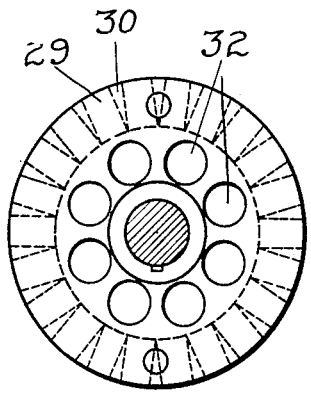
Fig. 3 is a horizontal sectional view along the line 3—3 of Fig. 1, looking in the direction of the arrows.
Figure 4:
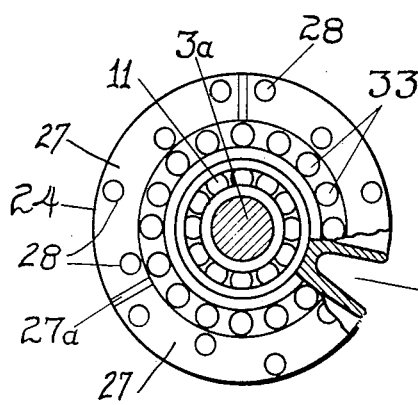
Fig. 4 is a horizontal sectional view along the line 4—4 of Fig. 1, looking in the direction of the arrows.

In order to dissipate the heat generated by engagement between the spool plate 7 and segments 27, the plate 7 provides a number of closely spaced radial openings 29 which, as best shown in Fig. 3, are separated by partitions 30 which serve as fan blades when the plate 7 is rotating with the spool 1. In order to provide for the flow of air outwardly through the openings 29, the plate 7 further provides an annular chamber 31 communicating with all of the openings 29 and also with a number of openings 32 surrounding the hub 8 of the spindle plate 7. In order to induce a flow of air around the stationary flange 24, a series of openings 33 are provided in the flange 24 within the seat 25 and the under surface of the flange is cut away to provide radial passages 34 leading to the openings 33, as best shown in Figs. 1 and 4.

Consequently, when the spool 1 is rotated during the twisting and winding operation, heat generated by engagement of the rotating bearing face 26 of the spool plate 7 with the friction segments 27 will be effectively dissipated by currents of air induced through the radial openings 29 in the plate 7 by the fan action of the partitions 30. Obviously, the greater the speed of rotation of the spool, the greater will be the fan action, and the flow of air around and between the segments 27 is such that it is practically impossible to appreciably heat the same, no matter how great the speed of rotation of the spool 1.

Figures 2, 5:
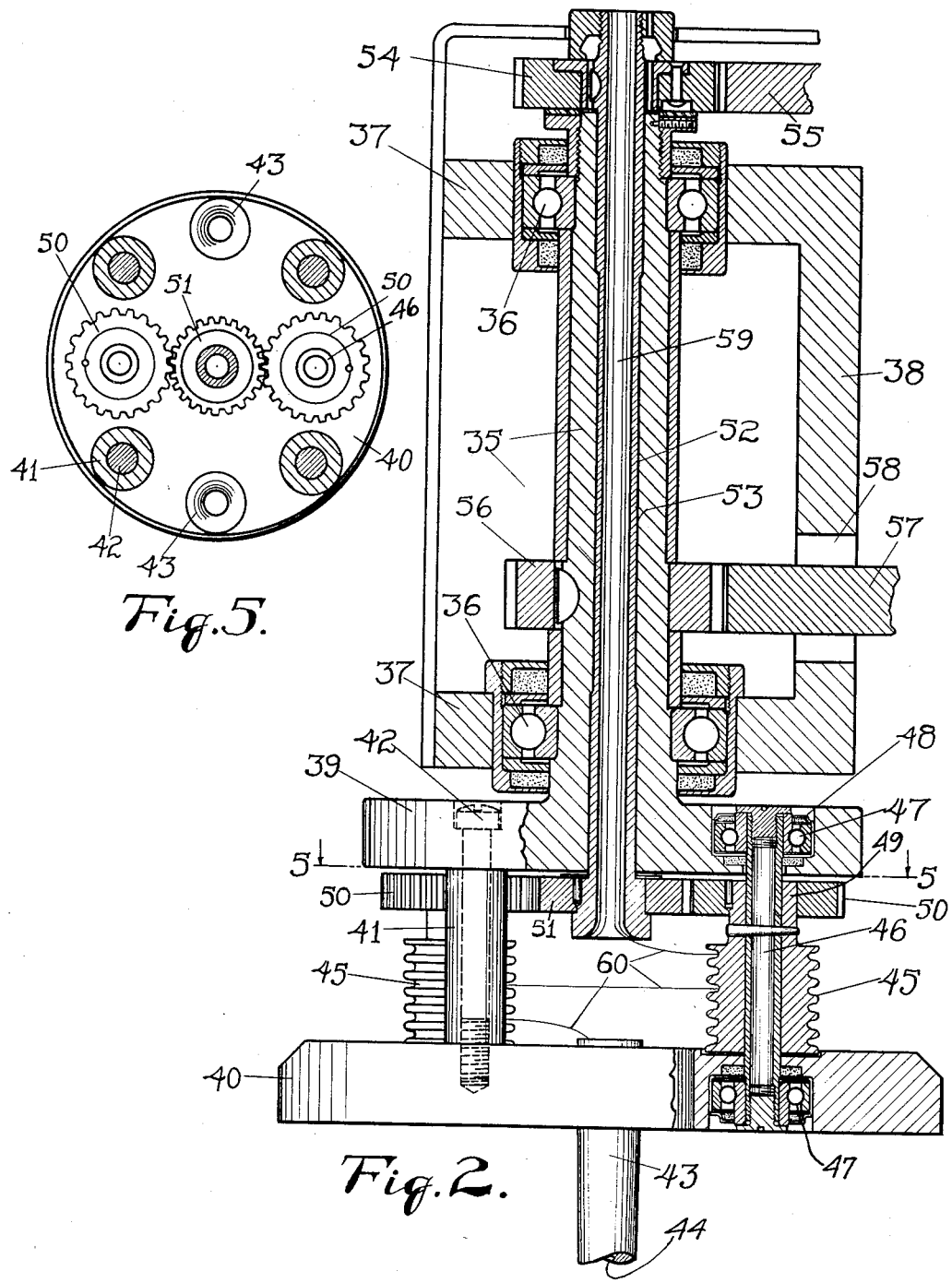
Fig. 2 is a view partially in vertical section and partially in elevation of the flier portion of the machine, Figs. 1 and 2 being complementary.
Fig. 5 is a horizontal sectional view along the line 5—5 of Fig. 2, looking in the direction of the arrows.

As best shown in the upper portion of Fig. 2, the flier comprises a sleeve 35 that is rotatably supported in anti-friction bearings 36 between the arms 37, 37 of a stationary bracket member 38. The sleeve 35 provides at its lower end a flange 39 which in turn supports a flier plate 40 spaced from the flange 39 by bushings 41 and rigidly secured thereto by bolts 42. The flier plate 40 provides a pair of flier arms 43 extending downwardly parallel to the spindle 3, as shown in Fig. 1, each flier arm providing a central opening 44 extending therethrough with the lower end of the opening 44 terminating just above the lower head 4 of the spool 1 when the spindle rail 20 is in its extreme upper position, as shown.

The flange 39 and flier plate 40 support between them a pair of grooved take-up drums 45 of the type usually employed on twisting machines, each drum 45 being pinned or otherwise secured to the vertical shaft 46 rotatably supported in anti-friction bearings 47 carried by the flange 39 and flier plate 40, respectively. The upper bearing 47 is received within a seat 48 provided in the flange 39 and this bearing serves to support shaft 46, so that the lower surface of the drum 45 is entirely free of the flier plate 40 when it is rotatably driven.

Each drum 45 provides a reduced portion 49 on which is mounted a gear 50 in mesh with a gear 51 carried at the lower end of a shaft 52 extending upwardly through an opening 53 in the flier sleeve 35. The upper end of the shaft 52 carries a gear 54 in mesh with a gear 55 driven from any suitable source of power, not shown. The flier sleeve 35 is also adapted to be rotatably driven in unison with the inner shaft 52 but at a different speed by means of a gear 56 in mesh with a driving gear 57 extending through an opening 58 in the bracket 38.

The shaft 52 provides a longitudinal opening 59 extending therethrough and filamentary material 60 for twisting is led downwardly through this opening 59 around both drums 45 and hence downwardly into the opening 44 of a flier arm 43 from the lower end of which it is led to the barrel of the spool 1. When the machine is in operation, rotation of the take-up drums 45 draws the material 60 downwardly through the shaft opening 59, while rotation of the flier imparts twist to the material and causes it to be wound on the spool 1. During the winding, the spool 1, being frictionally retarded, will rotate at a speed but slightly less than the speed of rotation of the flier arm, the rate of winding depending upon the rate of feed. This results in a uniform winding of the twisted material on the spool accompanied by an even distribution thereof due to the traversing action of the spindle rail 20.

When the flier is driven at high speed, the rotating drums 45 are strongly supported against any tendency to fly outwardly under the influence of centrifugal force due to the mounting of the drum shafts 46 between the flange 39 and plate 40. With the flange 39 and plate 40 firmly secured together in spaced relation, the ends of the drum shafts 46 are securely anchored and there can be no distortion thereof. Furthermore, the ball bearings 47 of the shafts 46 take the radial thrust of the shafts 46 above and below the drums 45, so that wear of the shafts is reduced to a minimum.

From a consideration of Fig. 5, it is evident that the entire flier structure is symmetrical about the axis of rotation of the sleeve 35, and as a result, the flier always rotates in perfect balance even when driven at very high speeds. In fact, it has been found in the operation of the flier that the flange 39 and plate 40 revolving about the flier axis, with the rotatably driven drums 45 therebetween, exert a gyroscopic effect which is beneficial in maintaining steady running of the flier structure without appreciable vibration. This balancing effect increases with the speed of the flier, the rotating mass of these parts serving to neutralize any tendency towards unbalance which might occur in other parts of the flier structure, as example, due to the pull of the material 60 on the lower end of a flier arm 43 as it winds on the spool.

I claim,

1. In a machine of the class described, the combination with a rotating flier adapted to draw filamentary material from a suitable source, and a member adapted to have a reciprocatory movement imparted thereto with respect to said flier, of a sleeve carried by said reciprocatory member, a spindle having a portion thereof supported for free rotation within said sleeve by antifriction bearings, a carrier slidably keyed on said spindle, a spool surrounding said spindle and adapted to rotate with said carrier, and a member of frictional material interposed between the lower face of said carrier and an extension of said bearing sleeve for supporting the weight of said carrier and spool.

2. In a machine of the class described, a vertically movable spindle rail, a sleeve carried thereby, a spindle having a portion thereof supported within said sleeve for free rotation about a vertical axis, a carrier slidably keyed on said spindle, a spool adapted to rotate with said carrier and a member of frictional material interposed between said spool carrier and an extension of said spindle sleeve.

3. In a machine of the class described, a vertically movable spindle rail, a sleeve carried thereby, a spindle having a portion thereof supported within said sleeve for free rotation about a vertical axis, a carrier slidably keyed on said spindle, a spool adapted to rotate with said carrier and a member of frictional material interposed between said spool carrier and an extension of said spindle sleeve, rotation of said carrier with said spool being adapted to set up a circulation of air around said frictional member.

4. In a machine of the class described, a spindle rail, a sleeve carried by said rail, a spindle having a portion thereof supported by anti-friction bearings within said sleeve, a carrier slidably keyed on said spindle, a spool rotatable with said carrier, spaced frictional members carried by an annular flange on said spindle sleeve with upper surfaces in engagement with the under side of said spool carrier, and passages extending through said flange in said carrier whereby the rotation of said carrier with the spool sets up a current of air around and between said frictional members.

5. In a flier construction, a rotatably driven sleeve supported about a vertical axis, a flange carried by the lower end of said sleeve, a plate spaced from and rigidly secured to said flange, and a take-up drum mounted on a shaft having its ends supported in anti-friction bearings received in said flange and in said plate.

6. In a flier construction, a rotatably driven sleeve supported about a vertical axis, a flange carried by the lower end of said sleeve, a plate spaced from and rigidly secured to said flange, a pair of take-up drums disposed between said flange and said plate, said drums being mounted on diametrically opposed shafts each having its ends rotatably supported in said flange and said plate, and a pair of diametrically opposed hollow flier arms carrier by said plate, with said drums and said arms symmetrically disposed with respect to the axis of said sleeve.

7. In a flier construction, a rotatably driven sleeve supported about a vertical axis, a solid circular flange carried by the lower end of said sleeve, a solid circular plate spaced from and rigidly secured to said flange by studs symmetrically disposed about the sleeve axis, a pair of drums disposed between said flange and said plate, said drums being mounted on diametrically opposed shafts equally spaced from the flier axis with the shaft ends rotatably supported in said flange and said plate, and means for rotatably driving said drums in unison with said sleeve, the revolving mass of said flange and plate and the rotation of said drums serving to produce a gyroscopic effect to maintain the rotating flier structure in balance.

CARL R. BROWNELL.